United States Patent [19]

Diggs

[11] 4,072,439
[45] Feb. 7, 1978

[54] SAFETY GROOVE DRILL PRESS AND ATTACHMENTS

[76] Inventor: Richard E. Diggs, P.O. Box 776, Carthage, Mo. 64836

[21] Appl. No.: 687,523

[22] Filed: May 18, 1976

[51] Int. Cl.² .................. B23B 39/00; B23D 7/08
[52] U.S. Cl. .................................... 408/90; 90/58 R
[58] Field of Search ............... 408/87, 88, 89, 90, 408/91, 234, 235, 236, 237, 241; 90/58 R, 58 A, 58 B

[56] References Cited

U.S. PATENT DOCUMENTS

| 1,986,006 | 1/1935 | McClellan et al. | 90/58 R |
|---|---|---|---|
| 2,356,300 | 8/1944 | Boettcher | 90/58 R X |
| 2,360,921 | 10/1944 | Wiken | 408/234 |
| 2,471,940 | 5/1949 | Dion | 408/89 |
| 2,676,413 | 4/1954 | Wharton et al. | 408/89 |
| 2,842,013 | 7/1958 | Muehling | 408/236 |
| 3,035,462 | 5/1962 | Revel | 408/88 |
| 3,165,977 | 1/1965 | Farmen | 408/236 X |
| 3,195,415 | 7/1965 | Shorb | 90/58 R |
| 3,837,757 | 9/1974 | Levine | 408/88 X |

Primary Examiner—Harrison L. Hinson
Attorney, Agent, or Firm—Schmidt, Johnson, Hovey & Williams

[57] ABSTRACT

An improved work-supporting table particularly adapted for shiftable mounting on the support column of a drill press is provided which permits the reciprocable drill bit to cut through the entire thickness of workpiece material supported on the table surface without defacement of the latter irrespective of the drill bit position relative to the table. An arcuate groove in the table surface directly below the drill bit extends parallel to the swinging path of travel of the table relative to the drill bit and provides clearance for the bit when the latter is reciprocably advanced to the table surface. The recessed surface of the groove is covered by a strip of hardened material which is resistant to the cutting action of the drill bit thereby protecting the groove against inadvertent defacement by engagement with the bit. The groove is further provided with a T-shaped cross section to permit coupling with various workpiece holding means for clamping the workpiece material against the table surface in response to selective operation of a biasing mechanism.

8 Claims, 11 Drawing Figures

SAFETY GROOVE DRILL PRESS AND ATTACHMENTS

This invention relates to machine tools and particularly concerns a work-supporting table for drill presses and the like whereon is provided workpiece clamping means and cutter clearance structure.

Work-supporting tables for machine tools are well-known in the art, typically comprising a precision ground flat plate or the like positioned adjacent the machine tool cutter and adapted for movement relative to the latter. In most machine tools these work-supporting tables are very accurately positionable relative to the cutter such that the material workpiece can be setup on the surface of the table to effect precision maching of the workpiece by the cutter. As well as being accurately positionable, these tables must be exactly machined to present a true flat surface for supporting the material workpiece so that the latter also will be accurately positioned relative to the machine tool cutter.

An additional desired feature of work-supporting tables is that they be adapted in some manner to accept a clamping means whereby the material workpiece may be held against the table surface to resist cutting torque applied to the workpiece during machining of the latter. These tables also should be provided with some type of clamping means to overcome the tendency of the material to lift away from the table in response to cutter action.

A problem with work-supporting tables in the prior art is their susceptibility to surface damage when contacted by the machine tool cutter. For example, in a drill press, repeated drilling of through holes in the workpiece often results in a plurality of holes drilled in the work-supporting table caused by the action of the drill bit as it breaks through the workpiece. Cutter damage to the work-supporting table is undesirable in that the required precision flat surface is distorted in areas adjacent the damaged portions of the surface.

Another problem with work-supporting tables heretofore available is their general lack of acceptable means for adequately clamping the workpiece to the table surface. Many of the machine tools currently available, particularly small drill presses and milling machines, have work-supporting tables which merely comprise a flat plate, thereby placing upon the operator the burden of providing some type of workpiece holding means. As a result, in small job shops, innumerable accidents occur when the operator attempts to machine a workpiece while the latter is insufficiently clamped with makeshift tooling or while merely holding the piece in his hand against the table, and subsequently having the workpiece thrown from the machine, injuring himself or fellow-workers.

Accordingly, it is an important object of the present invention to provide a work-supporting table for a machine tool wherein the machine tool cutter can operate through the entire thickness of workpiece material supported on the table surface without defacement of the latter, irregardless of the cutter position relative to the table.

In accordance with the above, it is another important object of my invention to provide a work-supporting table in a machine tool wherein a groove is presented in the supporting surface of the table and extends parallel to the path of relative movement between the table and the machine tool cutter.

Yet another important object of the instant invention is to provide a hardened strip of material in the portion of the work-supporting table which is subject to engagement with the cutter to render that portion of the table resistant to cutter action.

A further important object of the present invention is to provide a work-supporting table for a machine tool wherein a single groove in the table serves as a cutter clearance area as well as presents structure engageable by work-clamping means to bias the latter against the table surface.

Figure 1:
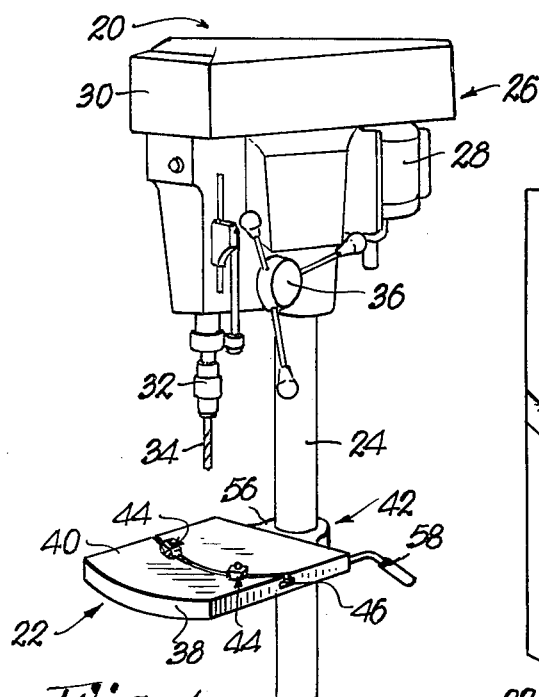
FIG. 1 is an isometric view of a drill press and including a work-supporting table constructed in accordance with the present invention.

FIG. 1 shows a drill press 20 including a work-supporting table 22 constructed in accordance with the present invention. Drill press 20 comprises a normally upright, cylindrical column 24 which carries table 22, and a powered drill head 26 supported at the upper end of column 24 in overlying relationship to table 22.

Drill head 26 includes an electric motor 28, a housing 30, and a vertically reciprocable, axially rotatable drill spindle 32. Spindle 32 has a cutter or drill bit 34 releasably secured thereto for unitary movement therewith. A handle 36 carried by housing 30 operates a mechanism (not shown) for selective reciprocation of spindle 32 parallel to column 24 toward and away from table 22.

Support table 22 includes a flat, generally rectangular plate 38 having a precision ground, flat upper surface 40; and a clamp mechanism 42 adapted for coupling with the upright column 24. Table 22 further comprises workpiece holding means which, in the preferred embodiment, is a pair of retainers 44 releasably secured to plate 38 in a manner described hereinbelow.

Clamping mechanism 42 includes a cylindrical sleeve 56 shiftably mounted on column 24 in surrounding coaxial engagement with the latter, and a lever 58 for selectively securing sleeve 56 against movement relative to column 24. Sleeve 56 has its axis extending perpendicular to surface 40, thereby positioning the table 22 on drill press 20 such that surface 40 is exactly perpendicular to the reciprocal path of travel of spindle 32.

The mechanism 42 allows table 22 to be moved selectively toward and away from bit 34 as well as to pivot about column 24 in an arcuate path of travel relative to the bit 34.

Plate 38 has an arcuate groove 46 directly below bit 34 extending across surface 40 parallel to the arcuate path of travel between table 22 and bit 34. The groove 46 is defined by a recessed surface 48 parallel to surface 40, and a pair of opposed, parallel, longitudinally arcuate walls 50 which extend between surface 48 and surface 40. The portion of walls 50 adjacent surface 40 are spaced closer together than the portion of walls 50 adjacent surface 48 to define a constriction in the form of opposed shoulders 52 thereby presenting groove 46 with a T-shaped cross-section. The entirety of surface 48 is covered with an overlying elongate strip 54 constructed of material having a hardness greater than drill bit 34. In the preferred embodiment drill bit 34 is fabricated from standard tool steel, and strip 54 is constructed of tungsten carbide.

Figure 2:
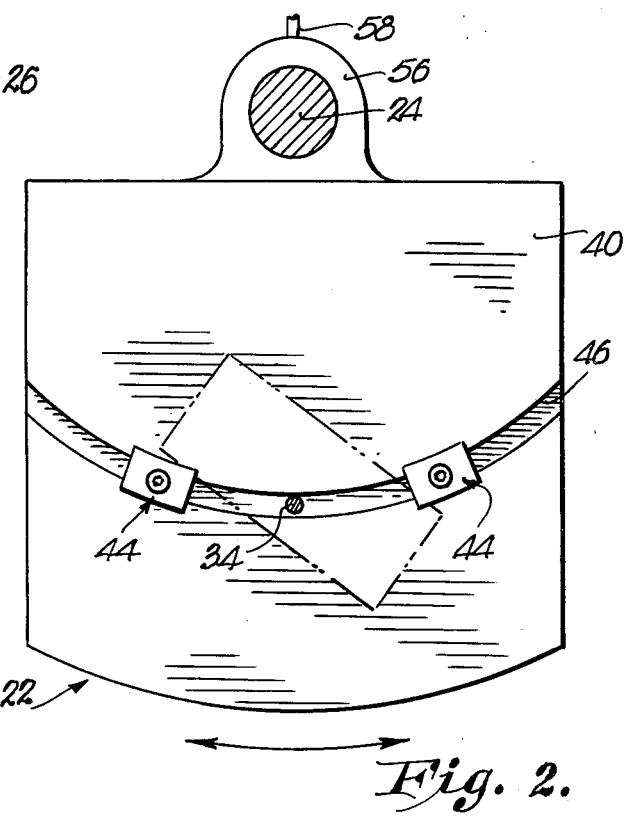
FIG. 2 is an enlarged plan view of the work-supporting table of FIG. 1 showing a workpiece supported thereupon.
Figure 3:
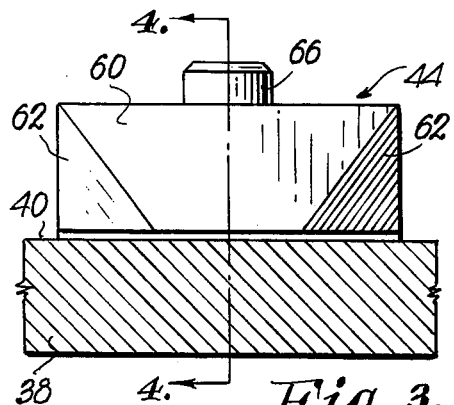
FIG. 3 is an enlarged, partial cross-sectional view of the worktable and showing the top portion of the preferred embodiment of the holding means.
Figure 4:
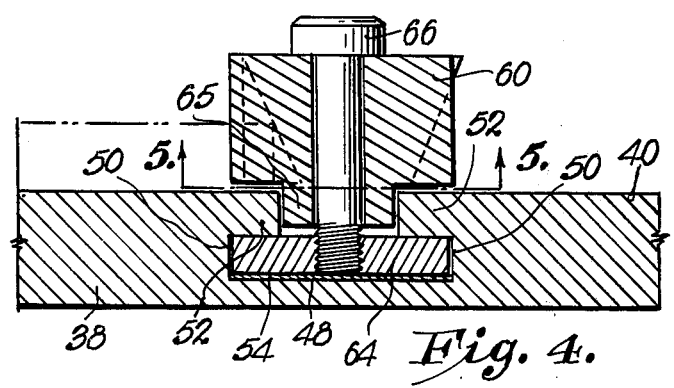
FIG. 4 is a partial cross-sectional view taken along line 4—4 of FIG. 3.

Retainers 44 each comprise a block member 60 having beveled corners 62, and a threaded anchor member 64 which is operably coupled with member 60 by a threaded fastener 66. Each member 64 is constructed of such a width as to be narrower than groove 46 but wider than the restricted portion of groove 46. Accordingly, each anchor member 64 is disposed for sliding movement within groove 46 while block members 60 rest upon surface 40 such that the retainers 44 can be selectively positioned along the length of groove 46 and then clamped to plate 38 by operation of threaded fastener 66. Beveled corners 62 face surface 40 in order to engage the workpiece material for clamping the latter against surface 40 as shown in FIGS. 2 and 4. Retainers 44 additionally are each provided with anti-rotation structure in the form of a tab 65 which extends from block 60 and is received in groove 46 between shoulders 52. Tabs 65 are almost as wide as the spacing between shoulders 52 and are longitudinally arcuate to conform to the configuration of groove 46.

Figure 6:
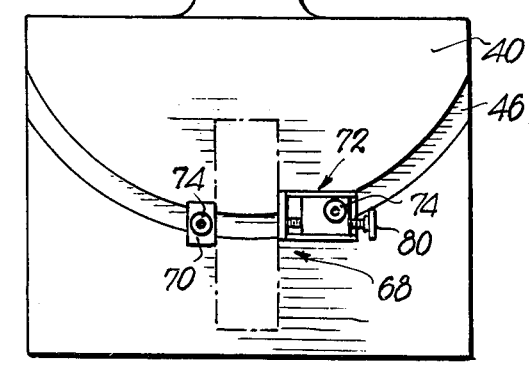
FIG. 6 is an elevational view of a work-supporting table constructed in accordance with the present invention and including a second embodiment of the holding means.
Figure 5:
FIG. 5 is a cross-sectional view taken along line 5—5 of FIG. 4.
Figure 7:
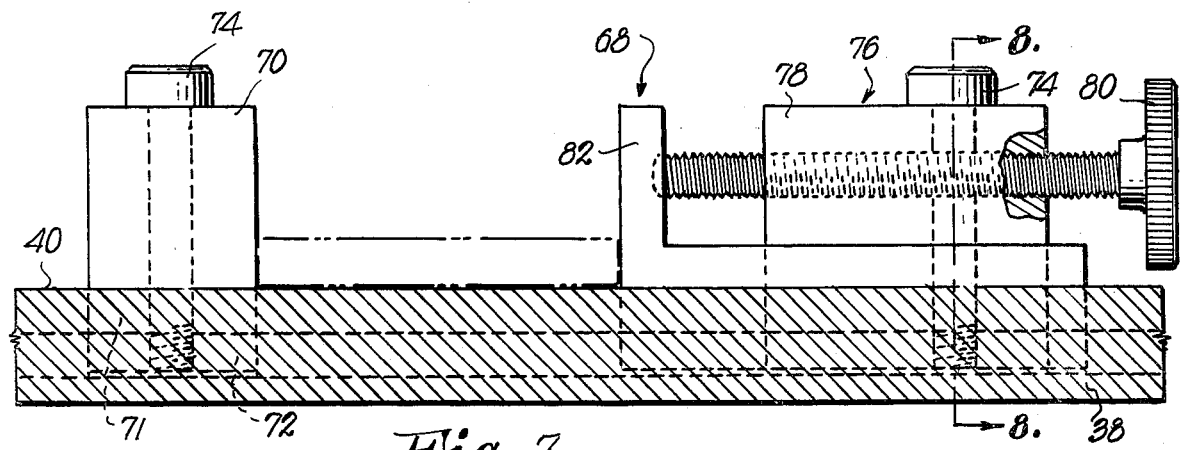
FIG. 7 is an enlarged, partial cross-sectional view of the worktable shown in FIG. 6.
Figure 8:
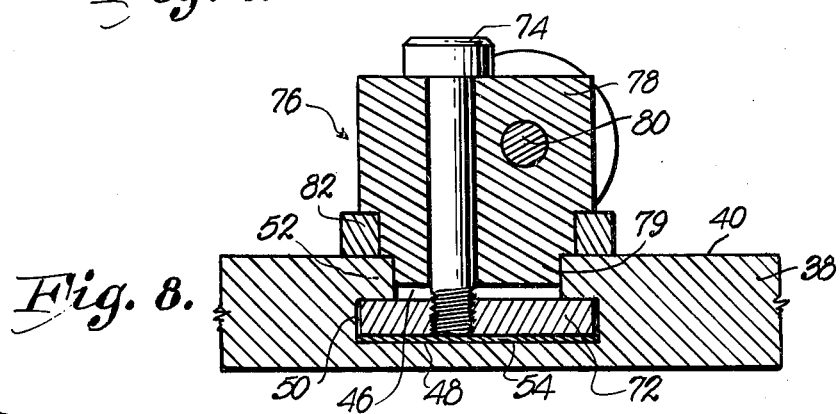
FIG. 8 is a partial cross-sectional view taken along line 8—8 of FIG. 7.

Another embodiment of the holding means shown in FIGS. 6, 7 and 8, comprises a vise assembly 68. Assembly 68 includes a stationary component 70 adapted to rest upon surface 40 and being coupled with a threaded anchor 72 by a fastener 74 such that component 70 can be selectively clamped against the surface 40 in the manner described for retainers 44. Additionally, vise assembly 68 includes a mover component 76 having a saddle 78 which rests upon surface 40 and is selectively biased against the latter by means of a threaded anchor 72 and a fastener 74 in a manner similar to the biasing of component 70. A lead screw 80 extends through saddle 78 parallel to the surface 40 and serves to move a slide 82 toward and away from saddle 78. As shown in FIG. 7, mover component 76 is adapted for use with stationary component 70 to clamp a workpiece therebetween. Vise assembly 68 is provided with anti-rotation structure analogous to tabs 65 in the form of tabs 71 and 79 extending respectively from component 70 and saddle 78 to engage groove 46 between shoulders 52.

Figure 9:
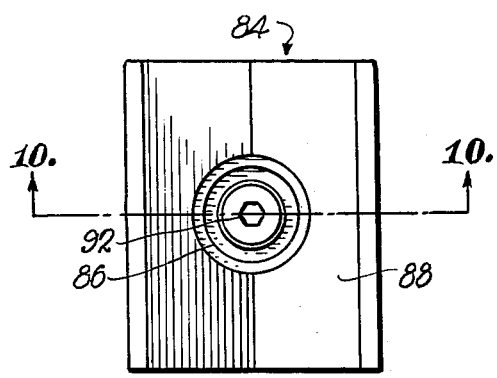
FIG. 9 is a plan view of a third embodiment of the holding means.
Figure 10:
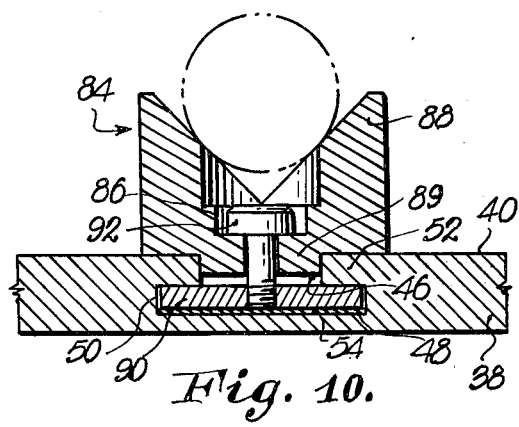
FIG. 10 is a cross-sectional view taken along line 10—10 of FIG. 9.

A third embodiment of the holding means is shown in FIGS. 9 and 10 and this embodiment includes a V-block assembly 84 which is adapted to slidably engage groove 46 of plate 38. Assembly 84 includes a block 88 which is provided with an anchor means similar to the anchor means in the other embodiments, including an anchor plate 90 coupled with block 88 by a threaded fastener 92 for selectively clamping block 88 against surface 40.

Block 88 is a standard machinists V-block having a minor modification wherein a counterbore 86 is provided in the bight of the V-surfaces to permit proper seating of threaded fastener 92 as well as to provide a clearance for the drill bit 34 when it breaks through workpiece material being supported by V-block assembly 84. In this connection, the head of threaded fastener 92 is constructed of the same hardened material as strip 54 such that the fastener 42 is impervious to damage by drill bit 34. An anti-rotation tab 89 extends from block 88 into groove 46.

Figure 11:
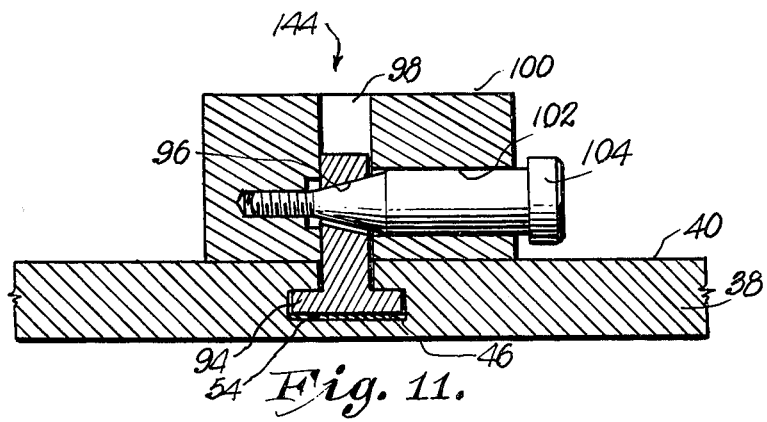
FIG. 11 is a cross-sectional view showing a second embodiment of the biasing mechanism.

FIG. 11 shows a second embodiment of the biasing mechanism for the retainer 44. A retainer 144 includes a block member 100 analogous to block member 60 and adapted to be clamped against surface 40 by operation of the biasing mechanism described hereinbelow. An anchor member 94 is disposed within groove 46 and extends beyond the latter above surface 40. A tapered aperture 96 extends horizontally through the portion of member 94 which protrudes beyond surface 40, and that portion of member 94 is received within a vertically extending aperture 98 in member 100. Member 100 also has a horizontally extending aperture 102 axially aligned with tapered aperture 96. A tapered screw 104 is positioned within aperture 102 extending through aperture 96 and threadably coupled to member 100. As shown in FIG. 11, progressive movement of screw 104 to the left will effect upward movement of anchor member 94 due to the tapered configuration of aperture 96, thereby causing member 100 to be biased against surface 40, clamping retainer 144 to plate 38. While the second embodiment of the biasing means is shown in a retainer, it is to be understood that this embodiment of the biasing means could be used with any of the described holding means embodiments.

In operation of the preferred embodiment, a workpiece of metal or the like is positioned upon surface 40 and retainers 44 are arranged to place one of the beveled corners 62 on each block member 60 in contact with the workpiece whereupon the fasteners 66 are tightened to bias respective members 60 against surface 40 thereby rigidly securing the retainers 44 and the workpiece to plate 38. A properly positioned workpiece rigidly held in place on surface 40 by holding means 44 is shown in FIG. 2. It is preferred to locate the workpiece in such a manner that rotation of the drill bit will be resisted by the retainers 44. In this regard, when viewing FIG. 2, it will be understood that the workpiece there shown is positioned to resist counterclockwise rotation and would require repositioning should the spindle 32 be rotating in a clockwise direction.

Once the clamping operation has been completed, table 22 is moved along column 24 to a desired distance from drill bit 34, pivoted along the arcuate path of travel for positioning the area to be drilled directly below the drill bit 34 and lever 58 actuated to lock table 22 to column 24. Next, the operator merely activates motor 28 causing the spindle 32 and drill bit 34 to rotate in a manner conducive to cutting the type of material present in the workpiece.

The rotating drill bit 34 is moved toward table 22 by hand-actuation of handle 36 until the workpiece is encountered whereupon cutting action of the drill 34 will cause a desired hole to be formed in the workpiece. The cutting action of bit 34 is maintained by continued pressure on handle 36 until the desired depth of the hole is obtained in the workpiece. Should it be desired to form a hole completely through the thickness of the workpiece, the handle 36 is continually operated until drill bit 34 breaks through the workpiece to form a through-hole. In this connection, as bit 34 breaks through the workpiece, the point of the bit 34 is received within groove 46 thereby providing the necessary clearance for the drill bit to accomplish a completed through-hole in the workpiece. Further, when the drill bit 34 undergoes a sudden downward surge caused by the quick release of cutting pressure as the drill 34 breaks through the workpiece, the downward movement of the drill 34 is arrested by contact of the latter with the strip 54. Strip 54, however, is not damaged by this encounter because of the fact that strip 54 is harder than drill bit 34 as hereinabove described.

Should additional holes be required to be machined in the workpiece, the table 22 is merely repositioned relative to drill bit 34, or the workpiece itself is moved along surface 40 to a new location, and then re-secured by retainers 44. It should be noted that regardless of the position of table 22 relative to drill bit 34, groove 46 will always be available to receive bit 34 as it breaks through the workpiece.

The operation of the second embodiment of the holding means is identical to the operation of the preferred embodiment with the exception of the initial positioning of the workpiece on surface 40 of table 22. In using the vice assembly 68, component 70 is first positioned on the surface 40 in a desired location and then secured thereto by operation of fastener 74 against anchor 72. Mover component 76 is next shifted to a location on the surface 40 spaced from component 70 to a distance sufficient to allow positioning of the workpiece therebetween and this component is then clamped against surface 40 by similar operation of a second anchor 72 and fastener 74. The desired workpiece is then placed between the components and slide 82 is advanced toward component 70 by operation of lead screw 80 until the workpiece is clamped rigidly therebetween.

The operator next actuates drill 34 in the manner hereinabove described to effect a desired hole in the workpiece. Repositioning of the workpiece is facilitated by use of assembly 68 in that the components need not be loosened from their clamping positions against surface 40 but rather lead screw 80 is merely actuated to release the clamping pressure between slide 82 and component 70 to release the workpiece held therebetween and allow movement of the latter to a new desired drilling location.

The third embodiment of the holding means, V-block 84, is specifically adapted for drilling round stock and is operated in a manner similar to the operation of the two embodiments above described. Block 88 is moved to a desired location along surface 40 and then rigidly secured to plate 38 by operation of fastener 92 against anchor 90. Table 22 is then positioned relative to drill head 26 such that counterbore 86 is directly below drill bit 34. The workpiece in the form of round stock is positioned upon support 88 in a manner shown in FIG. 10. Drill bit 34 is actuated and advanced to a cutting position adjacent the workpiece for machining a hole as described above. Should it be desired to drill a through-hole in the round stock, clearance for the drill bit 34 is provided by the counterbore 86, and a stop means is provided in the form of fastener 92.

The operation of the second embodiment of the biasing mechanism, shown as retainer 144 in FIG. 11, comprises first moving member 100 to a desired location on surface 40 and then advancing tapered screw 104 into tapered aperture 96, causing anchor member 94 to move upwardly against shoulders 52, thereby biasing the member 100 against the surface 40. Of course, subsequent drilling operation is exactly the same as described hereinabove.

From the above description of the structure and operation of the present invention it is clear that a work-supporting table for a machine tool is provided which offers a relatively high degree of safety to the operator as well as presents structure which avoids damage to the precision work surface of the table. The groove 46 establishes clearance for drill bit 34 when it is necessary to manufacture through-holes in a workpiece, thereby preventing damage to surface 40 by action of the drill bit 34. The unique arrangement of groove 46 parallel to the path of relative movement between table 22 and drill head 26 assures that there will be clearance for drill bit 34 irregardless of the position of table 22 relative to drill head 26. Moreover, the hardened strip 54 gives further stability to the table in that the bottom of groove 46 is protected against any damage from contact with drill bit 34.

Additionally, the groove 46 serves a secondary function to provide structure which is particularly adapted for coupling with holding means such as retainers 44 to rigidly secure the workpiece against surface 40. This particular feature offers a great deal of operator safety in an area which has heretofore been somewhat neglected, that is, with respect to small machine tools. It will be appreciated that the various holding means embodied in my invention offer a great deal of latitude to the machine tool operator in setting up his workpiece, while at the same time provides adequate protection against injuries caused when a workpiece is thrown from the work-supporting table in response to action of the machine tool cutter.

Having thus described the invention, what is claimed as new and desired to be secured by letters patent is:

1. In a drill press having a work-supporting table and a powered cutter above the table reciprocable toward and away from the latter, said table and said cutter being relatively swingable in an arcuate path of travel intersecting the reciprocative path of the cutter, the improvement including:
   structure on said table defining a continuous, arcuate, recessed groove in the surface of the table, said groove facing the cutter and being disposed directly below the latter,
   said groove extending parallel to the path of relative movement between said table and said cutter,
   said structure including a protector strip facing said cutter and defining the bottom of said groove,
   said strip being comprised of material which is harder than said cutter whereby to prevent damage to said structure when the latter comes in contact with said cutter.

2. In a drill press having a work-supporting table and a powered cutter above the table reciprocable toward and away from the latter, said table and said cutter being relatively swingable in an arcuate path of travel intersecting the reciprocative path of the cutter, the improvement including:
   structure on said table defining a continuous, arcuate, recessed groove in the surface of the table, said groove facing the cutter and being disposed directly below the latter,
   said groove extending parallel to the path of relative movement between said table and said cutter;

said strip being comprised of material which is harder than said cutter whereby to prevent damage to said structure when the latter comes in contact with said cutter;

said structure including a protector strip facing said cutter and defining the bottom of said groove; and an arcuate workpiece holder shiftably coupled with said groove-defining structure, the radius of curvature of said holder being substantially equal to that of said groove.

3. A drill press as claimed in claim 2, wherein said holder comprises a pair of interconnected members and mechanism for selectively biasing said members toward one another.

4. A drill press as claimed in claim 3, wherein one of said members is disposed within said groove below said constriction-defining means and the other of said members is disposed upon said surface, said biasing mechanism being operable to bias said one member against said restriction-defining means and said other member against said surface for selectively clamping said holding means to said table.

5. A drill press as claimed in claim 4, wherein said other member comprises a vise assembly having an arcuate adapted to be received within said groove.

6. A drill press as claimed in claim 4, wherein said other member comprises a V-block having an arcuate tongue adapted to be received within said groove.

7. A drill press as claimed in claim 3, wherein said biasing mechanism comprises a threaded connection extending between said members.

8. A drill press as claimed in claim 3, wherein said biasing mechanism includes a tapered aperture in one of said members and a tapered screw eccentrically disposed within said aperture.

* * * * *